(12) United States Patent
Flaks et al.

(10) Patent No.: US 10,810,995 B2
(45) Date of Patent: Oct. 20, 2020

(54) AUTOMATIC SPEECH RECOGNITION (ASR) MODEL TRAINING

(71) Applicant: Marchex, Inc., Seattle, WA (US)

(72) Inventors: Jason Flaks, Redmond, WA (US); Shane Walker, Kent, WA (US); Iroro Orife, Seattle, WA (US); Morten Pedersen, Seattle, WA (US)

(73) Assignee: Marchex, Inc., Seattle, WA (US)

( * ) Notice: Subject to any disclaimer, the term of this patent is extended or adjusted under 35 U.S.C. 154(b) by 0 days.

(21) Appl. No.: 15/965,690

(22) Filed: Apr. 27, 2018

(65) Prior Publication Data

US 2018/0315417 A1 Nov. 1, 2018

Related U.S. Application Data

(60) Provisional application No. 62/491,223, filed on Apr. 27, 2017.

(51) Int. Cl.
*G10L 15/06* (2013.01)
*G10L 15/26* (2006.01)

(52) U.S. Cl.
CPC ............ *G10L 15/063* (2013.01); *G10L 15/26* (2013.01); *G10L 2015/0635* (2013.01)

(58) Field of Classification Search
CPC ...... G10L 15/06; G10L 15/063; G10L 15/065
See application file for complete search history.

(56) References Cited

U.S. PATENT DOCUMENTS

| | | | | |
|---|---|---|---|---|
| 7,668,718 B2* | 2/2010 | Kahn | ............... | G10L 15/063 704/270 |
| 8,311,813 B2* | 11/2012 | Valsan | ............... | G10L 25/78 704/213 |
| 9,786,283 B2* | 10/2017 | Baker | ............... | G10L 15/08 |
| 2007/0118364 A1* | 5/2007 | Wise | ............... | G10L 25/78 704/215 |
| 2007/0118373 A1* | 5/2007 | Wise | ............... | G10L 15/26 704/235 |
| 2010/0070263 A1* | 3/2010 | Goto | ............... | G06F 16/685 704/8 |
| 2010/0318355 A1* | 12/2010 | Li | ............... | G10L 15/063 704/244 |

(Continued)

*Primary Examiner* — Michael N Opsasnick
(74) *Attorney, Agent, or Firm* — Perkins Coie LLP

(57) ABSTRACT

The disclosed system continuously refines a model used by an Automatic Speech Recognition (ASR) system to enable fast and accurate transcriptions of detected speech activity. The ASR system analyzes speech activity to generate text transcriptions and associated metrics (such as minimum Bayes risk and/or perplexity) that correspond to the quality of or confidence in each generated transcription. The system employs a filtering process to select certain text transcriptions based in part on one or more associated quality metrics. In addition, the system corrects for known systemic errors within the ASR system and provides a mechanism for manual review and correction of transcriptions. The system selects a subset of transcriptions based on factors including confidence score, and uses the selected subset of transcriptions to re-train the ASR model. By continuously retraining the ASR model, the system is able to provide ever faster and more accurate text transcriptions of detected speech activity.

20 Claims, 3 Drawing Sheets

(56) References Cited

U.S. PATENT DOCUMENTS

| | | | | |
|---|---|---|---|---|
| 2013/0024195 A1* | 1/2013 | White | ............... | G06F 3/0236 |
| | | | | 704/235 |
| 2016/0093294 A1* | 3/2016 | Kapralova | ............ | G10L 15/063 |
| | | | | 704/232 |
| 2017/0133007 A1* | 5/2017 | Drewes | ................. | G10L 15/02 |
| 2018/0315417 A1* | 11/2018 | Flaks | ................. | G10L 15/063 |

* cited by examiner

AUTOMATIC SPEECH RECOGNITION (ASR) MODEL TRAINING

CROSS-REFERENCE TO RELATED APPLICATION(S)

This application claims the benefit of U.S. Provisional Patent Application No. 62/491,223 entitled "SYSTEM AND METHOD FOR TRAINING AN AUTOMATIC SPEECH RECOGNITION (ASR) MODEL," filed Apr. 27, 2017, which is incorporated herein by reference in its entirety.

BACKGROUND

Individuals and businesses across a variety of industries have an ever-increasing need for accurate transcriptions of speech activity. For example, mobile device users rely on accurate transcriptions of voice input to accomplish everyday tasks such as composing text messages or e-mails, and issuing commands to various network-connected devices (e.g., thermostats, light switches, or electronic home assistants). Businesses likewise rely on accurate transcriptions of speech activity for a variety of purposes. For example, a business may desire to transcribe a customer phone request for a bank account balance, or to automatically analyze a telephone call to determine an outcome and take corrective action if necessary. Typically, such transcriptions are accomplished using an Automatic Speech Recognition (ASR) model.

To improve the accuracy of ASR models, a model is often trained with a training data set of known voice utterances. Generating a suitable training data set is one of the challenges driving the performance of ASR models. Typically, thousands of hours of audio is needed to train conventional ASR models, and despite these large data sets, conventional ASR models still historically struggle to enable accurate transcriptions and keep pace with rapid changes in colloquial and idiomatic language. Poorly constructed training data sets result in sub-par transcription performance. Therefore, the aforementioned individual and business concerns drive the need to develop better training sets to train ASR models and provide improved transcriptions.

DETAILED DESCRIPTION

A system and method for training an Automatic Speech Recognition (ASR) model are disclosed. The disclosed system and method continuously refine a model used by an Automatic Speech Recognition (ASR) system to enable fast and accurate transcriptions of detected speech activity. The ASR system analyzes speech activity to generate text transcriptions and associated metrics (such as minimum Bayes risk (MBR) and/or perplexity) that correspond to the quality of or confidence in each generated transcription. The system employs a filtering process to select certain text transcriptions based in part on one or more associated quality metrics. In addition, the system corrects for known systemic errors within the ASR system and provides a mechanism for manual review and correction of transcriptions. The system selects a subset of transcriptions based on factors that may include confidence score, and uses the selected subset of transcriptions to re-train the ASR model. By continuously retraining the ASR model, the system is able to provide ever faster and more accurate text transcriptions of detected speech activity.

Various embodiments of the invention will now be described. The following description provides specific details for a thorough understanding and an enabling description of these embodiments. One skilled in the art will understand, however, that the invention may be practiced without many of these details. Additionally, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments of the invention.

Figure 1:
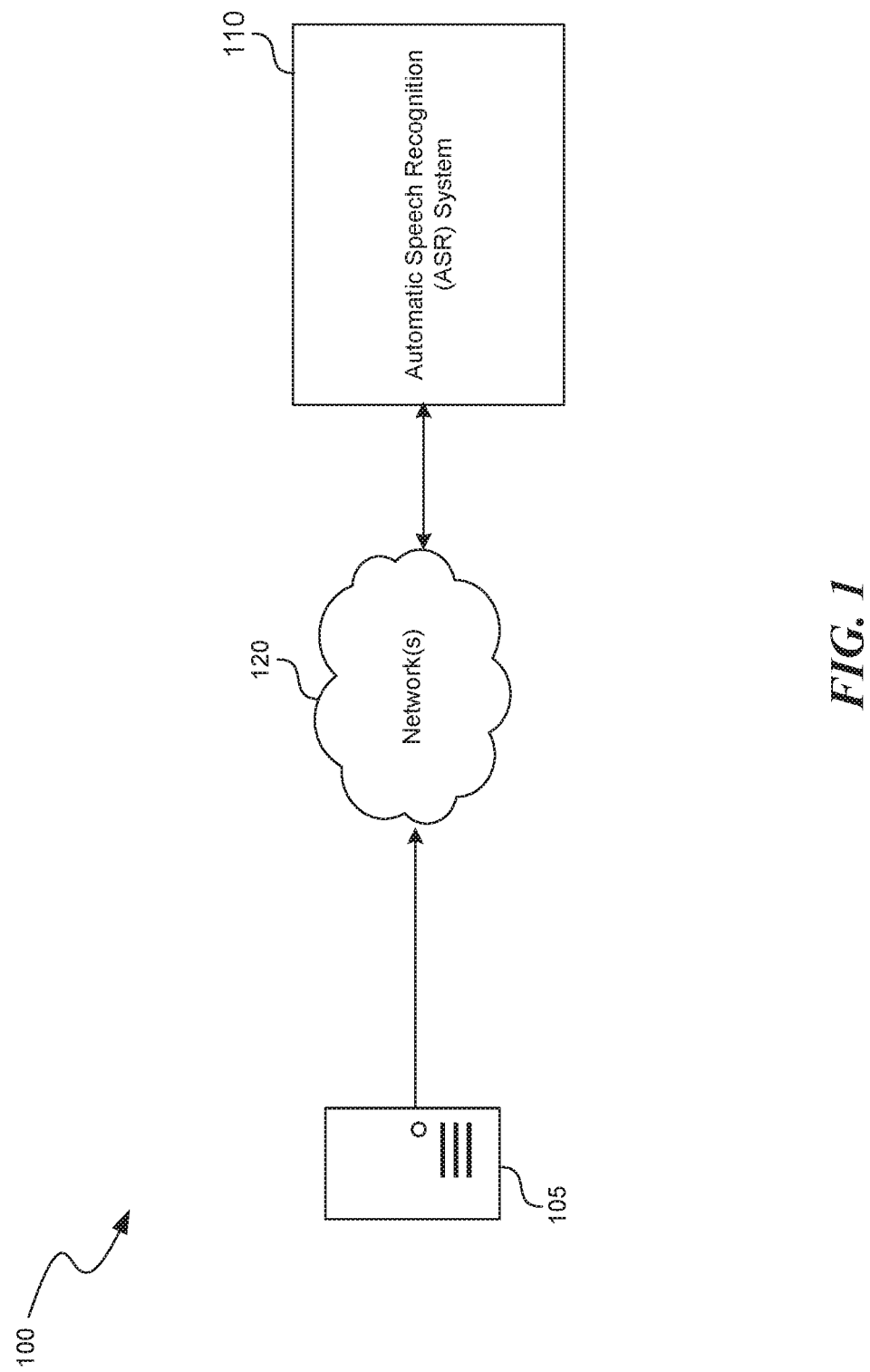
FIG. 1 is a block diagram illustrating an environment in which an Automatic Speech Recognition (ASR) may operate.

FIG. 1 is a block diagram illustrating an environment 100 in which an Automatic Speech Recognition (ASR) system may operate. Although not required, aspects and implementations of the system may be embodied in the general context of computer-executable instructions, such as routines executed by a general-purpose computer, a personal computer, a server, or other computing system. The system can also be embodied in a special purpose computer or data processor that is specifically programmed, configured, or constructed to perform one or more of the computer-executable instructions explained herein. Indeed, the terms "computer" and "computing device," as used generally herein, refer to devices that have a processor and non-transitory memory, like any of the above devices, as well as any data processor or any device capable of communicating with a network. Data processors include programmable general-purpose or special-purpose microprocessors, programmable controllers, application-specific integrated circuits (ASICs), programmable logic devices (PLDs), or the like, or a combination of such devices. Computer-executable instructions may be stored in memory, such as random access memory (RAM), read-only memory (ROM), flash memory, or the like, or a combination of such components. Computer-executable instructions may also be stored in one or more storage devices, such as magnetic or optical-based disks, flash memory devices, or any other type of non-volatile storage medium or non-transitory medium for data. Computer-executable instructions may include one or more program modules, which include routines, programs, objects, components, data structures, and so on that perform particular tasks or implement particular abstract data types.

In the environment 100, a telephone call processor 105 may connect to and communicate data over one or more wired or wireless network(s) 120, including public or private networks (e.g., the Internet) and the public switched telephone network. Network(s) 120 allows for communication within the environment 100. The network 120 can include a public switched telephone network (PSTN) or one or more wireless networks such as, but not limited to, a Local Area Network (LAN), Wireless Local Area Network (WLAN), Personal Area Network (PAN), Campus Area Network (CAN), Metropolitan Area Network (MAN), Wide Area Network (WAN), Wireless Wide Area Network (WWAN), Global System for Mobile Communications (GSM), Personal Communications Service (PCS), Digital Advanced Mobile Phone Service (D-Amps), Bluetooth, Wi-Fi, Fixed Wireless Data, 2G, 2.5G, 3G, 4G, LTE networks, or enhanced data rates for GSM evolution (EDGE) networks. The network 120 can include wired phone networks.

Using Network(s) 120, telephone call processor 105 may transmit call audio to ASR system 110. For example, telephone call processor 105 may transmit an 8 kHz, p-law-decoded WAV file for each channel (e.g., a caller channel and an agent channel) of one or more phone calls. As explained in more detail herein, ASR system 110 generates text transcriptions of the received call audio based on a stored ASR model. To continually improve the quality of the generated text transcriptions, ASR system 110 generates a confidence score for each transcription and provides a mechanism for manual correction of generated text transcriptions. ASR system 110 then improves the quality of future transcriptions by filtering out low quality transcriptions and using higher quality transcriptions to retrain the ASR model.

Figure 2:
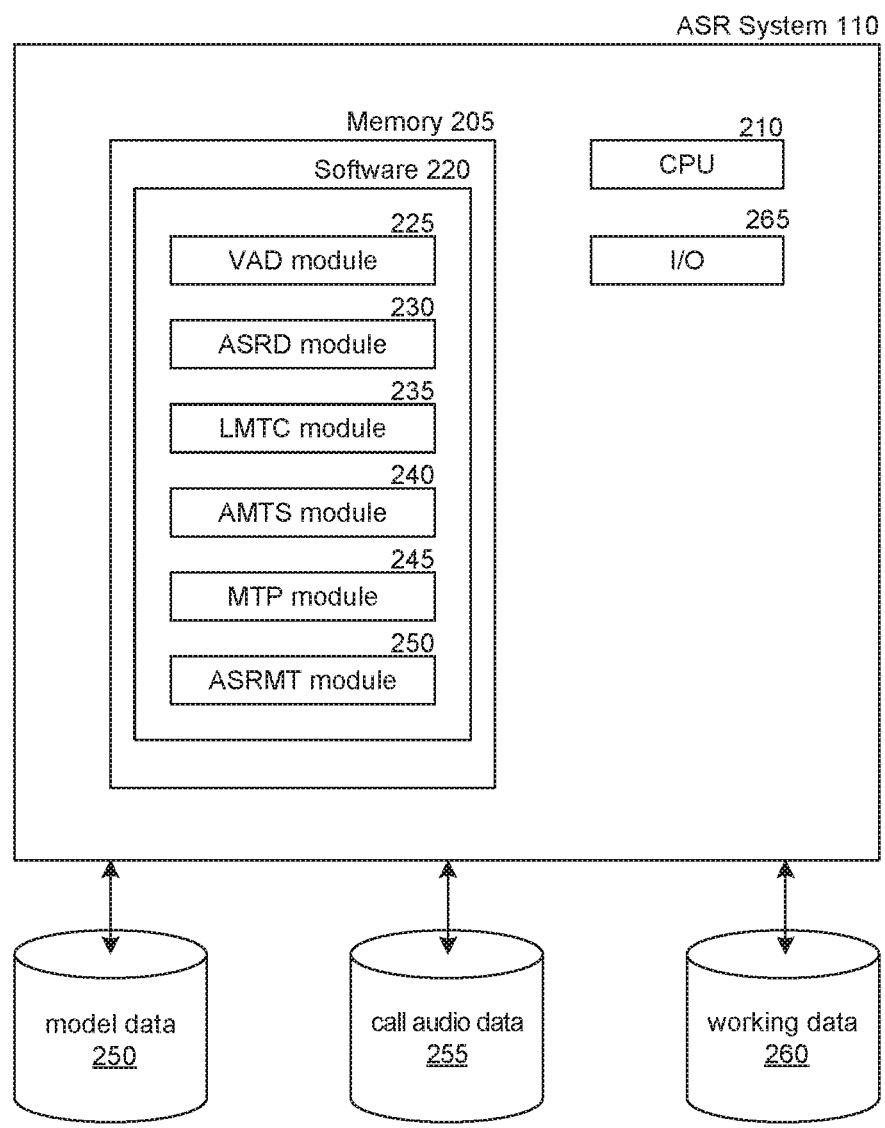
FIG. 2 is a block diagram illustrating exemplary elements of an ASR System in greater detail.

FIG. 2 is a block diagram illustrating exemplary elements of ASR System 110 of FIG. 1 in greater detail. As shown in FIG. 2, ASR System 110 includes one or more central processing units (CPUs) 210 for executing software 220 stored in a memory 205. ASR System 110 also includes an input/output (I/O) module 265 that is coupled to CPU 210. I/O module 265 can be a network card, video card, audio card, USB port, FireWire port, or other card or port that allows data to be either input to ASR System 110 (e.g., from a keyboard, mouse, touchpad or touch panel) or output to another device (e.g., a monitor, computer, printer, or other output mechanism).

Memory 205 stores software 220 comprising one or more modules. The modules perform certain methods or functions of ASR System 110 described herein and can include components, subcomponents, or other logical entities that assist with or enable the performance of some or all of these methods or functions. The modules of ASR System 110 include a Voice Activity Detector (VAD) module 225, an ASR Decoder (ASRD) module 230, a Language Model Transcription Corrector (LMTC) module 235, an Acoustic Model Transcription Selector (AMTS) module 240, a Manual Transcription Processor (MTP) module 245, and an ASR Model Trainer (ASRMT) module 250, each of which is described briefly below and in more detail with respect to FIG. 3.

VAD module 225 receives audio of a telephone call, detects speech activity (such as speech present in one or more channels of audio in a telephone call) and passes one or more utterances in the detected speech activity to ASRD module 230. ASRD module 230 uses one or more language models to analyze each detected utterance and generate a corresponding text transcription and quality score of the utterance. ASRD module 230 passes generated quality scores to AMTS module 240 and passes generated text transcriptions to LMTC module 235. LMTC module 235 receives text transcriptions from ASRD module 230 and analyzes the received transcriptions to identify and correct systematic errors in the received transcriptions. LMTC module 235 stores the corrected transcriptions in a Language Model Training Corpus. AMTS module 240 receives confidence scores from ASRD module 230 and receives corrected transcriptions from LMTC module 235. AMTS module 240 removes transcriptions corresponding to certain types of utterances, including those resulting from non-speech audio or non-target languages.

MTP module 245 processes manual transcriptions that are used to build and retrain the ASR system, and includes a human interface tool that enables a user to manually review, verify, and/or correct transcriptions. ASRMT module 250 receives filtered and corrected transcriptions from the Acoustic Model Training Corpus and the Language Model Training Corpus, and determines which of the received transcriptions to use for retraining the ASR Model. ASRMT module 250 then passes the selected transcriptions to ASRD module 230 to retrain the language model. ASR System 110 may access multiple datasets, including model data 250 (which may include the Acoustic Model Training Corpus, the Language Model Training Corpus, and the ASR model itself), call audio data 255, and working data 260 (which may include various data such as confidence scores; unselected, uncorrected, and/or unfiltered text transcriptions, etc.). In some implementations, the datasets are NoSQL databases. These datasets are accessible by some or all of the modules described above, and the modules can store information in these datasets or update information in these datasets continuously, periodically, or sporadically.

Figure 3:
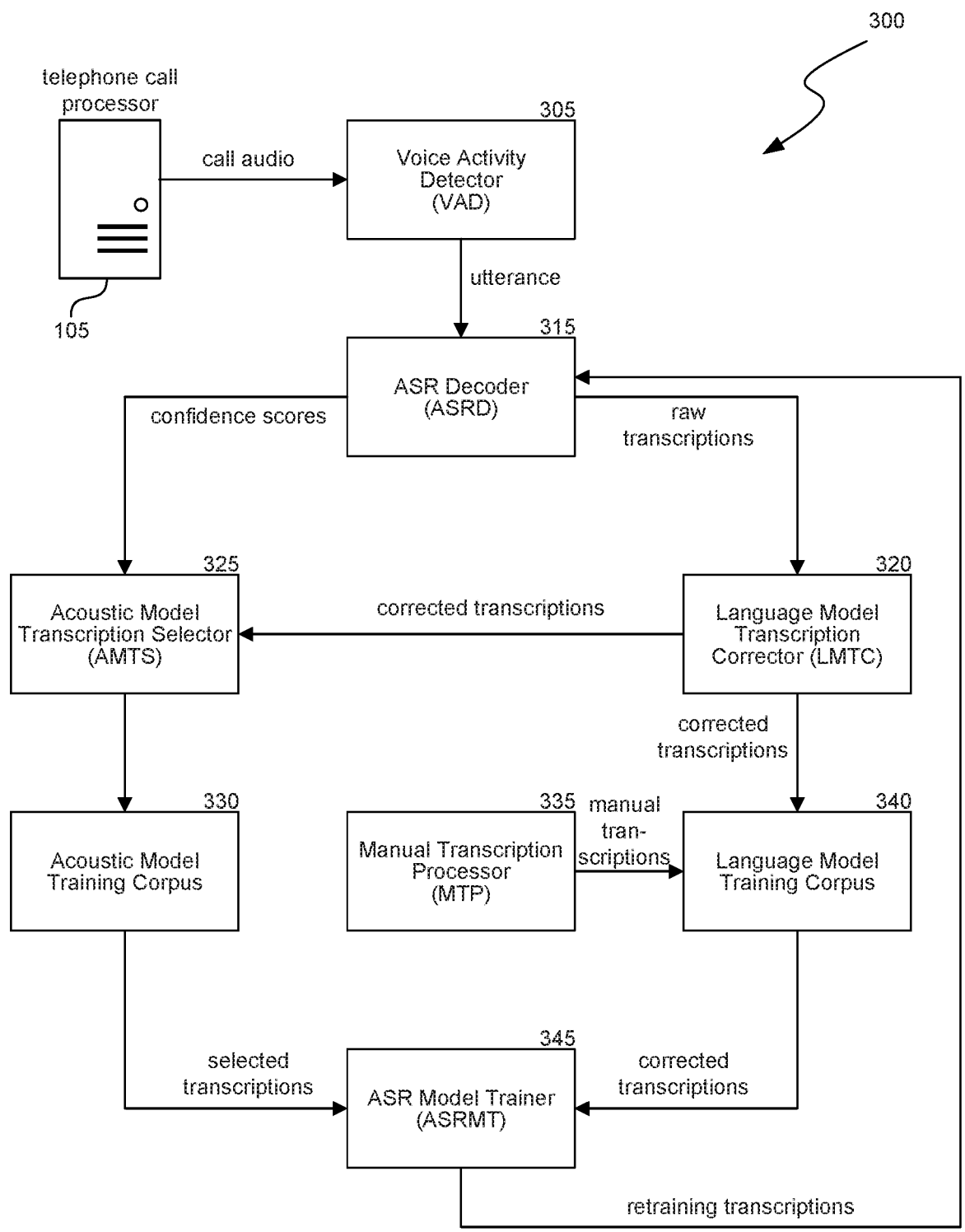
FIG. 3 is an exemplary block diagram illustrating an embodiment of a system for training an ASR model may operate.

FIG. 3 is an exemplary block diagram 300 illustrating an environment in which one embodiment of a system for training an Automatic Speech Recognition (ASR) model may operate. Voice Activity Detector (VAD) 305 detects speech activity, such as speech present in one or more channels of audio in a telephone call or speech that is provided to VAD 305 via a network-connected device such as telephone call processor 105. Telephone call processor 105 may be a computer server or other telephony equipment capable of receiving multiple phone calls and providing call audio to VAD 305. In some embodiments, VAD 305 is capable of receiving call audio from separate caller and agent channels and detecting speech activity on a caller-basis or agent-basis. For example, VAD 305 may receive audio of each a caller channel and an agent cannel of one or more phone calls as 8 kHz, p-law-decoded WAV files. The detected speech activity may comprise one or more single utterances, such as "have a great day" or "thanks so much." In some instances, an utterance may comprise non-speech activity, such as environmental noise, music, or beeping noises. As explained in more detail herein, the disclosed system analyzes transcriptions of utterances that are detected in speech activity to determine which utterances to use and which utterances to ignore when training an ASR model.

After detecting speech activity, VAD 305 passes each utterance in the detected speech activity to ASRD 315. ASR decoder 315 uses one or more language models to analyze each detected utterance and generate a corresponding raw text transcription of the utterance. In addition, for each generated raw transcription, ASRD 315 may generate one or more confidence metrics that are indicative of an expected confidence in or quality of the generated raw transcription. For example, in some embodiments, ASRD 315 may run a large-beam decoder tuned for high accuracy to generate N-best lattices, which are in turn used to compute a minimum Bayes risk (MBR) score for each utterance. As another example, in some embodiments, ASRD 315 may compute a perplexity score. The perplexity score may be based on, for example, a Kneser-Ney smoothed 5-gram model with a 125K vocabulary and 5M n-grams. While MBR is used as a measure of expected risk in the entire ASR system based on the full N-best lattice, language model perplexity is a measurement of how well a probabilistic language model will predict a new sample text. Low perplexity indicates that the language model is good at predicting the new text and is not confused. When combined, MBR and perplexity provide a reliable indication as to how difficult it is for the ASR system to arrive at best possible transcription.

Language Model Transcription Corrector (LMTC) 320 receives text transcriptions from ASR decoder 315 and analyzes the received transcriptions to identify and correct systematic errors in the received transcriptions. In some embodiments, LMTC 320 uses a set of transcriptions from a ground truth model to correct the received transcriptions. LMTC 320 may sort and count high prevalence, unique, full utterances to identify common elements where incomplete language representation and/or missing audio context can be fixed. In some embodiments, LMTC 320 uses n-gram or part-of-speech tagging to identify transcriptions to be corrected. LMTC 320 may distinguish between caller and agent side transcriptions when determining corrections to transcriptions in order to account for expected differences, such as an expected greater diversity of conversational speech on the caller side, and an expected higher quality audio being present on the agent side. Table 3.1 provides example mistranscriptions and ground truth corrections on the caller side, and Table 3.2 provides example mistranscriptions and ground truth corrections on the agent side.

TABLE 3.1

| Caller Mistranscriptions | Ground Truth |
| --- | --- |
| have a grey day | have a great day |
| yeah that be great | yeah that'd be great |
| okay think so much | okay thanks so much |
| b. e. as in boy | b. as in boy |
| a two one zero | eight two one zero |
| i don't have any count | i don't have an account |

TABLE 3.2

| Agent Mistranscriptions | Ground Truth |
| --- | --- |
| horror leather increase | for all other inquiries |
| rest you | press two |
| oppressed you | or press two |
| arrest three | press three |
| urn or cared | customer care |
| call back drone normal | call back during normal |
| for parts in excess serious | for parts and accessories |
| active eight | activate |
| Chevy taco | chevy tahoe |
| now and if you words | now in a few words |
| retire fritcher jack | free tire pressure check |

Acoustic Model Transcription Selector (AMTS) 325 receives confidence scores from ASRD 315 and receives corrected transcriptions from LMTC 320 (as described above). AMTS 325 removes (or ignores) transcriptions corresponding to certain types of utterances, including those resulting from non-speech audio (e.g., hold-time music, telephony signaling tones, pseudo random impulsive noises from typing on keyboards, cellphones dropping, laughter, coughing and other environmental noise). In addition, AMTS 325 may remove transcriptions corresponding to utterances from non-target languages. For example, AMTS 325 may be concerned with only English language transcriptions and may be configured to remove or ignore transcriptions corresponding to non-English language utterances such as "hola" in Spanish or "willkommen" German. AMTS 325 may identify transcriptions of utterances corresponding to non-speech audio, non-target languages, and other types of undesirable utterances in part by their associated perplexity score, which may be relatively high. Table 3.3 provides examples of such transcriptions that may be removed by AMTS 325.

TABLE 3.3

| Removed Utterances | Audio Content |
| --- | --- |
| be in they need to | "bienvenidos" (Spanish) |
| but i spend you own | "para espanol" (Spanish) |
| bull pretty men dogs | "oprima dos" (Spanish) |
| much guess seem go | "marque cinco" (Spanish) |
| it it it's it's it | telephony signaling noise |
| whole whole whole | telephonic beeps |
| mhm mhm mhm mhm | impulsive noise |
| mm mm mm mm mm | impulsive noise |
| [noise] i i i | environmental noise |
| and uh and uh and uh | hold music |
| or or or or or | hold music |
| in a in a in in a | hold music |

After removing or ignoring transcriptions related to certain types of utterances as described above, AMTS 325 may select a subset of the remaining transcriptions for inclusion in Acoustic Model Training Corpus (AMTC) 330. The selected transcriptions for inclusion in AMTC 330 may be chosen based on confidence scores (e.g., MBR, perplexity, or any combination thereof) received from ASR Decoder 315.

Manual Transcription Processor (MTP) 335 processes manual transcriptions that are used to build and retrain the ASR system. The disclosed system makes use of manual transcriptions in certain instances, such as when building an initial language model based on a ground truth set of transcriptions, and when refining an existing language model with transcriptions that have been manually corrected and/or verified by a human. To provide manual correction and/or verification, MTP 335 includes a "human fix tool" that enables manual review and correction of transcriptions before they are used to retrain the ASR model. The human fix tool may comprise software that displays a user interface presenting transcriptions via a display on an electronic device (e.g., a computer monitor, mobile device, or tablet) and plays corresponding call audio via one or more speakers of the electronic device. The user interface may include options to verify that a presented transcription is correct, to provide a correct transcription via a drop-down menu of suggested corrections, to provide a correct transcription to entering free-form text (via a physical keyboard, a virtual keyboard, or by any other input means of the electronic device). The user interface may also include an option to remove or ignore a particular presented transcription for any reason, including for the reason that the presented transcription corresponds to a non-speech utterance or an utterance from a non-target language. MTP 335 may add the manually corrected transcriptions to the ground truth set of transcriptions used to build the initial language model, and may send the combined set of transcriptions to Language Model Training Corpus (LMTC) 340.

ASR Model Trainer (ASRMT) 345 receives filtered and corrected transcriptions from AMTC 330 and LMTC 340 and determines which of the received transcriptions to use for retraining the ASR Model. ASRMT 345 may use a variety of criteria to determine which of the received transcriptions to select for retraining purposes. In one embodiment, ASRMT 345 may select a first set of received transcriptions having the lowest Bayes risk scores, and may select a second set of received transcriptions having the lowest perplexity scores. ASRMT 345 may then combine the first and second sets of text transcriptions and select a fixed number or percentage of the combined set for use in retraining the ASR model. In another embodiment, ASRMT 345 may choose a predetermined number or percentage or transcriptions from AMTC 330 having the lowest perplexity scores and may choose a predetermined number or percentage of transcriptions from LMTC 340 having the lowest MBR scores, or vice versa. In yet another embodiment, ASRMT 345 may choose transcriptions having an MBR score below a predetermined threshold and/or transcriptions having a perplexity score below a predetermined threshold.

Preferably, the group of transcriptions selected by ASRMT 345 for retraining the ASR model include transcriptions having relatively low perplexity scores and transcriptions having relatively low MBR scores. Because the different metrics measure different qualities of the transcriptions, a combined set of selected transcriptions offers a desirable diversity of utterances for language model retraining. After determining which of the received transcriptions to use for retraining the ASR Model, ASRMT 345 sends the selected transcriptions to ASR decoder 315 to retrain the model. By adding manually corrected transcriptions to the ground truth set of transcriptions, and by analyzing new voice activity to generate additional transcriptions, the disclosed system is able to build a new language model for the next iteration of filtering and confidence scoring, thereby progressively reducing the error rate and improving the overall quality of the ASR model.

Remarks

The Figures and above description provide a brief, general description of a suitable environment in which the invention can be implemented. Although not required, aspects of the invention may be implemented in the general context of computer-executable instructions, such as routines executed by a general-purpose data processing device, e.g., a server computer, wireless device or personal computer. Those skilled in the relevant art will appreciate that aspects of the invention can be practiced with other communications, data processing, or computer system configurations, including: Internet appliances, hand-held devices (including personal digital assistants (PDAs)), wearable computers, all manner of cellular or mobile phones (including Voice over IP (VoIP) phones), dumb terminals, media players, gaming devices, multi-processor systems, microprocessor-based or programmable consumer electronics, set-top boxes, network PCs, mini-computers, mainframe computers, and the like. Indeed, the terms "computer," "server," and the like are generally used interchangeably herein, and refer to any of the above devices and systems, as well as any data processor.

Aspects of the invention can be embodied in a special purpose computer or data processor that is specifically programmed, configured, or constructed to perform one or more of the computer-executable instructions explained in detail herein. While aspects of the invention, such as certain functions, are described as being performed exclusively on a single device or single computer, the invention can also be practiced in distributed environments where functions or modules are shared among disparate processing devices, which are linked through a communications network, such as a Local Area Network (LAN), Wide Area Network (WAN), or the Internet. In a distributed computing environment, program modules may be located in both local and remote memory storage devices. Aspects of the invention may be stored or distributed on tangible computer-readable media, including magnetically or optically readable computer discs, hard-wired or preprogrammed chips (e.g., EEPROM semiconductor chips), nanotechnology memory, biological memory, or other data storage media.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention. When statements or subject matter in an incorporated by reference conflict with statements or subject matter of this application, then this application shall control.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates the various aspects of the invention in any number of claim forms. For example, certain aspects of the disclosed system be embodied as a means-plus-function claim, or in other forms, such as being embodied in a computer-readable medium. (Any claims intended to be treated under 35 U.S.C. § 112(f) will begin with the words "means for", but use of the term "for" in any other context is not intended to invoke treatment under 35 U.S.C. § 112(f).) Accordingly, the applicant reserves the right to pursue additional claims after filing this application to pursue such additional claim forms, in either this application or in a continuing application.

We claim:

1. A computer-implemented method in an Automatic Speech Recognition (ASR) system for training an ASR model, the method comprising:
   receiving audio information from one or more telephone calls;
   detecting speech activity in the received audio information;
   generating one or more text transcriptions of the detected speech activity, wherein the generated text transcriptions are based on an ASR model;
   determining a confidence score for each of the generated one or more text transcriptions;
   identifying an error with respect to one of the generated text transcriptions, wherein the error is identified in part based on a set of known mistranscriptions;
   in response to identifying the error with respect to one of the generated text transcriptions, modifying text in the generated text transcription to correct the identified error, wherein text in the generated text transcription is modified automatically in part based on a set of ground truth corrected transcriptions corresponding to the set of known mistranscriptions;
   selecting a plurality of the text transcriptions to be used to retrain the ASR model, wherein the text transcriptions are selected based in part on the confidence score; and
   modifying the ASR model based on the selected plurality of text transcriptions.

2. The method of claim 1, wherein the selected plurality of generated text transcriptions to be used to retrain the ASR model includes at least one text transcription that has been corrected.

3. The method of claim 1, wherein the received audio comprises a caller channel and an agent channel, and further wherein the identification of an error with respect to one of the generated text transcriptions and the modification of the generated text transcription corresponds to the channel on which the corresponding speech activity was detected.

4. The method of claim 1, wherein the determined confidence score is a minimum Bayes risk (MBR) score or a perplexity score.

5. The method of claim 1, wherein the identified error with respect to one of the generated text transcriptions corresponds to an utterance that is not speech activity or an utterance that is not part of a target language.

6. The method of claim 1, wherein the selected plurality of generated text transcriptions to be used to retrain the ASR model comprises transcriptions selected based on a predetermined number or percentage or transcriptions having a highest MBR score.

7. The method of claim 1, wherein the selected plurality of generated text transcriptions to be used to retrain the ASR model comprises transcriptions selected based on a predetermined number or percentage or transcriptions having the lowest perplexity score.

8. A system for training an Automatic Speech Recognition (ASR) model, the system comprising:
   at least one processor;
   at least one memory storing instructions, which when executed by the at least one processor, performs a method for:
      receiving audio information from one or more telephone calls;
      detecting speech activity in the received audio information;
      generating one or more text transcriptions of the detected speech activity, wherein the generated text transcriptions are based on an ASR model;
      determining a confidence score for each of the generated one or more text transcriptions;
      identifying an error with respect to one of the generated text transcriptions, wherein the error is identified in part based on a set of known mistranscriptions;
      in response to identifying the error with respect to one of the generated text transcriptions, modifying text in the generated text transcription to correct the identified error, wherein text in the generated text transcription is modified automatically in part based on a set of ground truth corrected transcriptions corresponding to the set of known mistranscriptions;
      selecting a plurality of the text transcriptions to be used to retrain the ASR model, wherein the text transcriptions are selected based in part on the confidence score; and
      modifying the ASR model based on the selected plurality of text transcriptions.

9. The system of claim 8, wherein the selected plurality of generated text transcriptions to be used to retrain the ASR model includes at least one text transcription that has been corrected.

10. The system of claim 8, wherein the received audio comprises a caller channel and an agent channel, and further wherein the identification of an error with respect to one of the generated text transcriptions and the modification of the generated text transcription corresponds to the channel on which the corresponding speech activity was detected.

11. The system of claim 8, wherein the determined confidence score is a minimum Bayes risk (MBR) score or a perplexity score.

12. The system of claim 8, wherein the identified error with respect to one of the generated text transcriptions corresponds to an utterance that is not speech activity or an utterance that is not part of a target language.

13. The system of claim 8, wherein the selected plurality of generated text transcriptions to be used to retrain the ASR model comprises transcriptions selected based on a predetermined number or percentage or transcriptions having a highest MBR score.

14. The system of claim 8, wherein the selected plurality of generated text transcriptions to be used to retrain the ASR model comprises transcriptions selected based on a predetermined number or percentage or transcriptions having the lowest perplexity score.

15. A non-transitory computer-readable medium comprising instructions configured to cause one or more processors to perform a method for training an Automatic Speech Recognition (ASR) model, the method comprising:
- receiving audio information from one or more telephone calls;
- detecting speech activity in the received audio information;
- generating one or more text transcriptions of the detected speech activity, wherein the generated text transcriptions are based on an ASR model;
- determining a confidence score for each of the generated one or more text transcriptions;
- identifying an error with respect to one of the generated text transcriptions, wherein the error is identified in part based on a set of known mistranscriptions;
- in response to identifying the error with respect to one of the generated text transcriptions, modifying text in the generated text transcription to correct the identified error, wherein text in the generated text transcription is modified automatically in part based on a set of ground truth corrected transcriptions corresponding to the set of known mistranscriptions;
- selecting a plurality of the text transcriptions to be used to retrain the ASR model, wherein the text transcriptions are selected based in part on the confidence score; and
- modifying the ASR model based on the selected plurality of text transcriptions.

16. The non-transitory computer-readable medium of claim 15, wherein the selected plurality of generated text transcriptions to be used to retrain the ASR model includes at least one text transcription that has been corrected.

17. The non-transitory computer-readable medium of claim 15, wherein the received audio comprises a caller channel and an agent channel, and further wherein the identification of an error with respect to one of the generated text transcriptions and the modification of the generated text transcription corresponds to the channel on which the corresponding speech activity was detected.

18. The non-transitory computer-readable medium of claim 15, wherein the determined confidence score is a minimum Bayes risk (MBR) score or a perplexity score.

19. The non-transitory computer-readable medium of claim 15, wherein the identified error with respect to one of the generated text transcriptions corresponds to an utterance that is not speech activity or an utterance that is not part of a target language.

20. The non-transitory computer-readable medium of claim 15, wherein the selected plurality of generated text transcriptions to be used to retrain the ASR model comprises transcriptions selected based on a predetermined number or percentage or transcriptions having (a) a highest MBR score or (b) a lowest perplexity score.

* * * * *